United States Patent
Manini et al.

(10) Patent No.: US 7,036,531 B2
(45) Date of Patent: May 2, 2006

(54) SYSTEM FOR THERMALLY INSULATING TUBULAR BODIES

(75) Inventors: Paolo Manini, Arluno (IT); Pierattilio Di Gregorio, Sulmona (IT)

(73) Assignee: Saes Getters S.p.A., Lainate (IT)

( * ) Notice: Subject to any disclaimer, the term of this patent is extended or adjusted under 35 U.S.C. 154(b) by 0 days.

(21) Appl. No.: 10/751,760

(22) Filed: Jan. 5, 2004

(65) Prior Publication Data

US 2004/0134556 A1   Jul. 15, 2004

Related U.S. Application Data

(63) Continuation-in-part of application No. PCT/IT02/00417, filed on Jun. 25, 2002.

(30) Foreign Application Priority Data

Jul. 9, 2001   (IT) ............................ MI2001A1458

(51) Int. Cl.
*F16L 9/14*   (2006.01)
(52) U.S. Cl. ........................ 138/149; 138/151; 138/156
(58) Field of Classification Search ................ 138/149, 138/151, 156
See application file for complete search history.

(56) References Cited

U.S. PATENT DOCUMENTS

| | | | |
|---|---|---|---|
| 3,698,588 A * | 10/1972 | Pogorski ................ 220/592.26 |
| 3,810,491 A * | 5/1974 | Hildebrandt ................ 138/149 |
| 3,812,886 A * | 5/1974 | Hallwood .................... 138/149 |
| 4,509,561 A * | 4/1985 | Litz ............................. 138/149 |
| 4,594,279 A | 6/1986 | Yoneno et al. |
| 4,680,070 A * | 7/1987 | Hughes ........................ 156/218 |
| 4,874,648 A * | 10/1989 | Hill et al. .................... 428/35.9 |
| 5,142,842 A | 9/1992 | Schirmer |
| 5,236,758 A | 8/1993 | Sextl et al. |
| 5,316,816 A * | 5/1994 | Sextl et al. ..................... 428/69 |
| 5,368,184 A * | 11/1994 | Fay et al. ..................... 220/562 |
| 5,843,353 A | 12/1998 | De Vos et al. |
| 5,871,830 A * | 2/1999 | Miller ........................... 428/70 |
| 5,934,338 A * | 8/1999 | Perstnev et al. ............. 138/149 |
| 5,943,876 A | 8/1999 | Meyer et al. |
| 6,037,033 A * | 3/2000 | Hunter ........................... 428/72 |
| 6,076,561 A * | 6/2000 | Akedo et al. ................ 138/149 |
| 6,110,310 A | 8/2000 | Eyhorn et al. |
| 2003/0101683 A1* | 6/2003 | Gregorio ..................... 52/794.1 |

FOREIGN PATENT DOCUMENTS

WO   WO 97/37166 A1   9/1997
WO   WO 01/38779 A1   5/2001

* cited by examiner

*Primary Examiner*—James Hook
(74) *Attorney, Agent, or Firm*—Akin Gump Strauss Hauer & Feld, LLP

(57) ABSTRACT

A heat insulating system for tubular bodies includes at least two superimposed evacuated panels (4, 4'), at least one of the panels is formed essentially by an evacuated envelope which contains a polymeric filling material inside thereof, and at least one other panel is formed essentially by an evacuated envelope which has an inorganic filler present inside thereof, in the form of powders, fibers or their mixtures. Each of the evacuated panels (4, 4') is rolled up around a rolling axis to such that two opposed edges thereof (5, 5') parallel to the rolling axis are mutually set side by side. The rolled evacuated panels (4, 4') are also arranged with the edges (5) of an evacuated panel (4) being staggered with respect to the edges (5') of another evacuated panel (4').

19 Claims, 2 Drawing Sheets

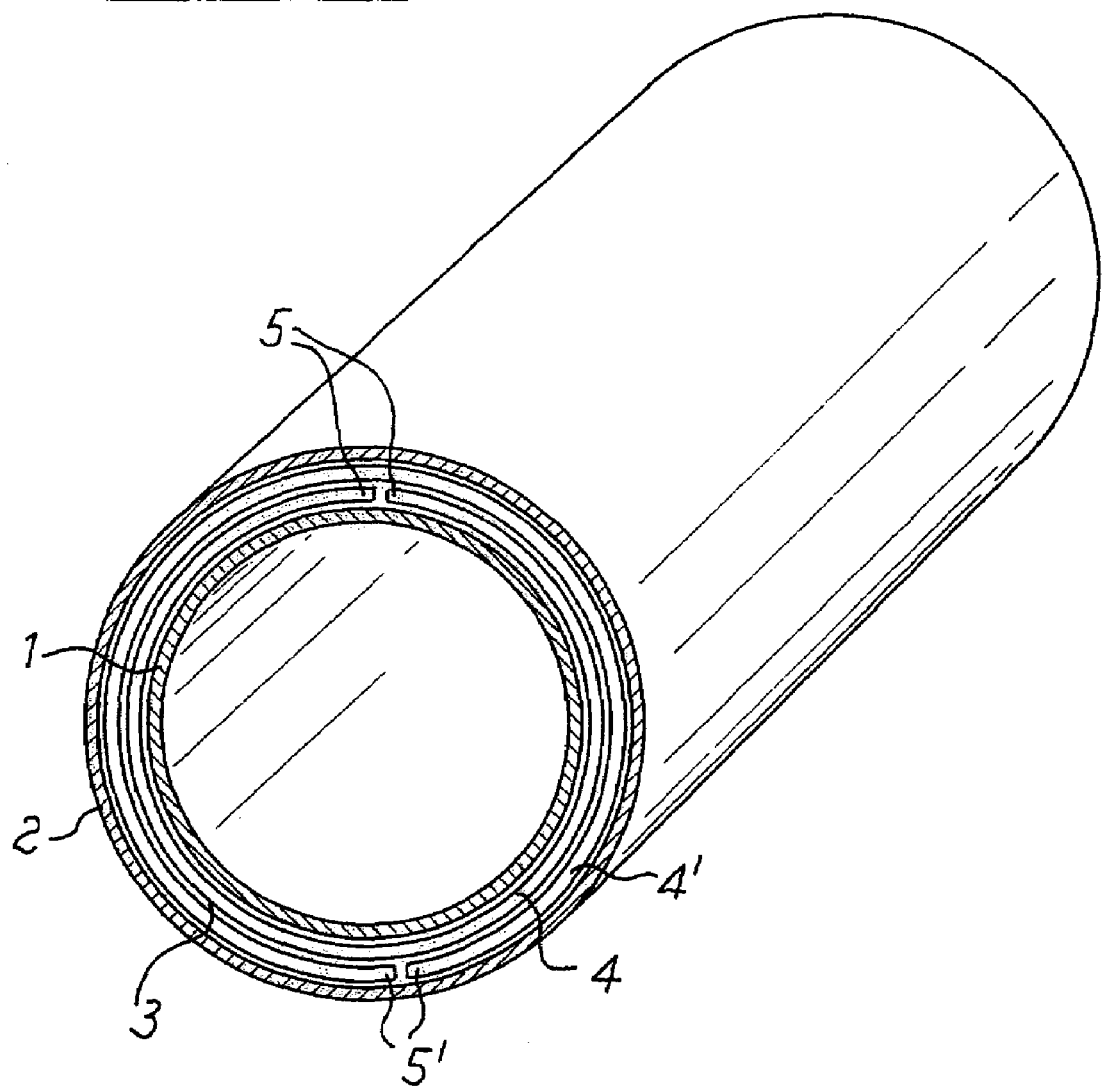

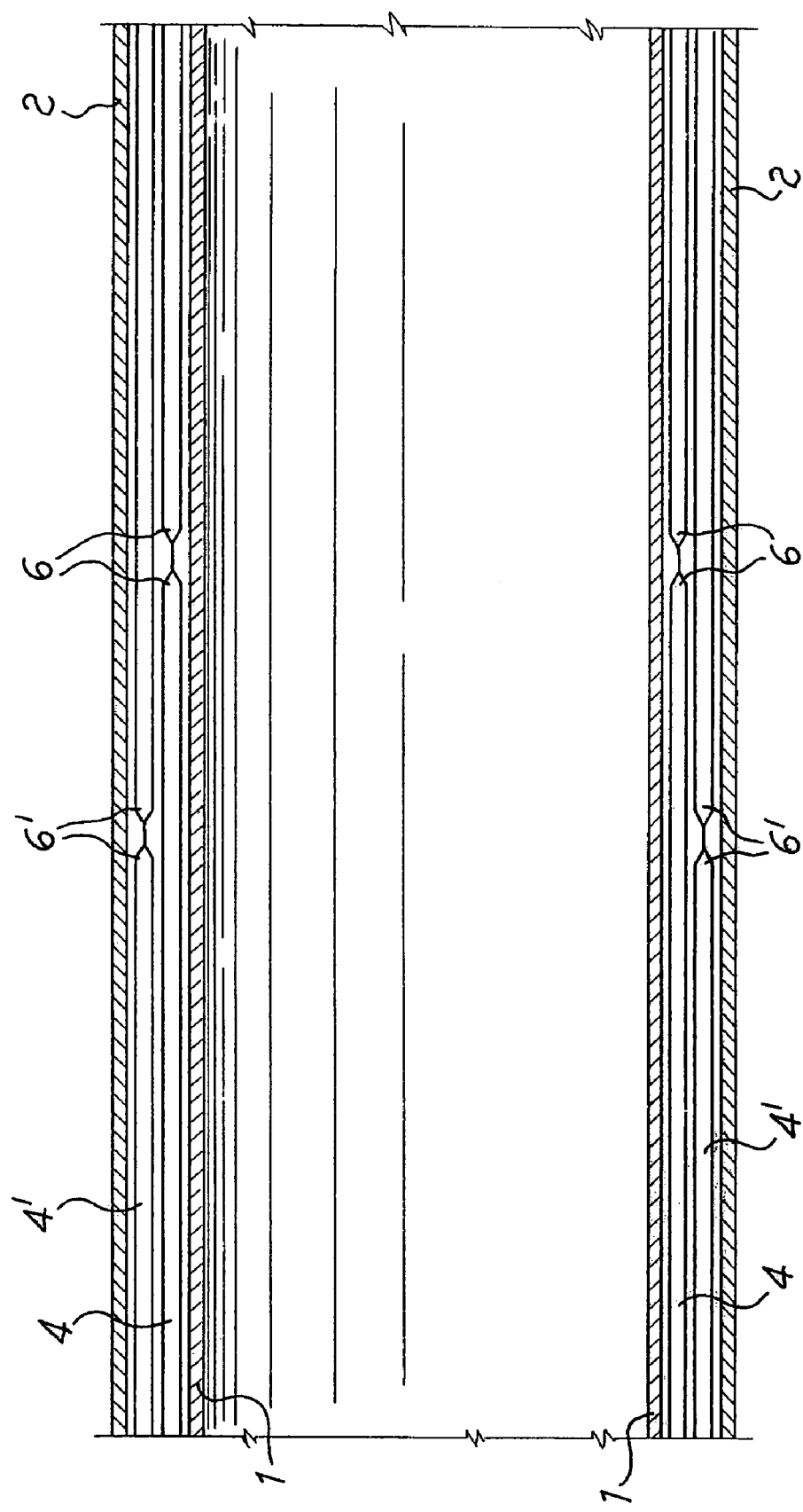

SYSTEM FOR THERMALLY INSULATING TUBULAR BODIES

CROSS-REFERENCE TO RELATED APPLICATIONS

This application is a continuation-in-part of International Application No. PCT/IT02/00417, filed Jun. 25, 2002, which was published in the English language on Jan. 23, 2003, under International Publication No. WO 03/006871 A1.

BACKGROUND OF THE INVENTION

The present invention relates to a system for thermally insulating tubular bodies, for example pipes for transporting cold or hot fluids.

Many kinds of thermal insulating systems are known. In particular, it is known that in order to form the lagging of a body of any shape it is possible to provide such a body with a double outer wall, in the interspace of which can be placed a material having low thermal conductivity, such as mineral wool, glass wool or polyurethane.

However, the insulating properties of such materials are not very high, and in some cases it is necessary to use great thicknesses thereof for maintaining the internal temperature of the body constant. This is, for instance, the case with undersea pipes for transporting crude oil, that are generally formed by two coaxial tubes of carbon steel or stainless steel, in which the oil flows in inner tube, while the outer tube acts as a protection. This construction is known in the field as "pipe-in-pipe." In order to allow long-distance piping of oil, while avoiding increases in its viscosity, the oil must be maintained at the lifting temperature between about 25 and 90° C. Therefore, in the interspace between the two tubes a great amount of insulating material must be inserted. This requires the use of an over-sized outer tube, and consequently the overall volume and weight of the pipe increase notably, since the amount of steel required for the outer tube rises quickly as a function of the diameter thereof. Also, the costs for producing the pipe increase proportionally.

Alternatively, the interspace between the coaxial tubes may be evacuated, so as to exploit the low thermal conductivity of a vacuum with a view to achieving insulation of the pipe. In this case, however, the construction process of the pipe becomes more complex, and it is necessary to place in the same interspace a getter material able to absorb the gases that over time may outgas from the steel forming both tubes.

There are further well known evacuated insulating panels formed by an envelope, wherein a filling material is present under vacuum. The envelope serves to prevent (or reduce to the highest degree) the entrance of atmospheric gases into the panel, so as to maintain a vacuum level that is compatible with the thermal insulation degree required by the application. To this end, the envelope is made of so-called "barrier" sheets, which are flexible sheets characterized by a low gas permeability. Barrier sheets can be formed of a single component, generally polymeric, such as polyolefin or polyester (e.g., polyethylene terephthalate, PET). More commonly, however, barrier sheets are multilayers of different components. In the case of multilayers, the "barrier" effect is given by one of the component layers (this may be a polymeric layer, an aluminum foil, or a metallized plastic layer), whereas the other layers generally have the function of mechanically supporting and protecting the barrier layer. Multilayer barrier sheets are described, e.g., in U.S. Pat. Nos. 4,594,279; 5,142,842; 5,236,758; and 5,943,876. The filling material, on the contrary, mainly has the function of maintaining the spacing of the opposing faces of the envelope when a vacuum is formed in the panel. The filling material must have a porous or uneven internal structure, so that the pores or spaces thereof may be evacuated to perform the insulating function. This material can be inorganic, for example silica powder, glass fibers, aerogels, diatomaceous earth, etc.; or polymeric, such as polyurethane or polystyrene rigid foams, both in the form of boards and powders.

Thanks to their very low thermal conductivity, relatively thin evacuated panels are adequate to carry out an effective insulation of oil ducts. Therefore, it is possible to reduce the internal dimensions of the interspace of such ducts, thus alleviating the above named problems.

For example, International patent publication No. WO 01/38779 describes an evacuated insulating panel having a tubular shape and suitable to be placed within the interspace of an undersea conduit for oil piping.

However, a first inconvenience of such panels is the brittleness of their envelope, which can easily crack and may thus allow the passage of gases into the panel. Such a passage obviously jeopardizes the insulating properties of the panel and, in the case of undersea pipelines, it causes an irreparable damage, because the replacement of the damaged panel cannot be effected.

Another drawback of evacuated panels lies in that they do not provide an adequate insulation to tubular bodies. As a matter of fact, they generally have a planar shape and must therefore be bent to abut two opposed edges, in order to fit them to the tubular form of the inner interspace of oil ducts.

However, an evacuated panel curved in this manner does not allow perfect insulation of the inner tube of the pipe, and in particular the zone corresponding to the edges that are abutting may become poorly insulated. In that zone, in particular, a cooling of the inner tube can occur, and consequently also the oil flowing in the inner tube becomes cold, thus thickening and causing a partial obstruction in the pipe.

U.S. Pat. No. 6,110,310 describes a system for the thermal insulation of pipe-in-pipe conduits, formed of at least two layers of superimposed curved insulating panels. The joints of the panels are preferably staggered, so that there is almost no part of the inner pipe that "sees" the outer pipe, resulting in a further reduction in heat loss. However, the panels of U.S. Pat. No. 6,110,310 contain as filler a molded element made of microporous materials. The microporous materials comprise a mixture of inorganic oxides and preferably also inorganic fibers, to increase the mechanical stability of the molded element. The molded elements of this patent require rather deep incisions in order to be bent, making their construction rather complex. Besides, inorganic filler materials are rather heavy.

BRIEF SUMMARY OF THE INVENTION

The object of the present invention is therefore to provide an insulating system for tubular bodies, which is free of such inconveniences.

This object is achieved by means of an insulating system comprising at least two superimposed evacuated panels, each of which is internally evacuated and is essentially formed by an envelope, inside which there is contained a discontinuous or porous filling material, each panel being rolled up to the extent that its two opposed edges, which are parallel to the rolling axis, are set side by side, and its other two edges perpendicular to the rolling axis form the end edges of the rolled evacuated panel, characterized in that at least one of the evacuated panels comprises a polymeric filling material and at least another evacuated panel comprises an inorganic filling material.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1 is a cross-sectional, perspective view of a double-walled duct, in the interspace of which is inserted the insulating system according to the embodiment of the invention; and FIG. 2 is a longitudinal sectional view of the duct in FIG. 1.

DETAILED DESCRIPTION OF THE INVENTION

With reference to FIGS. 1 and 2, there is shown a section of a pipe wherein the insulating system according to the present invention is installed. The pipe is formed in a known manner by an inner tube 1 and an outer tube 2, being coaxial with inner tube 1 and having such a diameter that an interspace 3 is present between the tubes. Inside tube 1 the fluid to be insulated, for example oil, is allowed to flow. The tubes 1 and 2 can be made of any suitable material, for example carbon steel in the case of undersea pipes for transporting oil.

In interspace 3 two evacuated panels 4 and 4' are disposed, each of which is rolled up so that its two opposed edges 5 and 5', respectively, which are parallel to the rolling axis, are set side by side. The other two edges, which are perpendicular with respect to the rolling axis, thus form the end edges 6 and 6', respectively, of the rolled panels 4 and 4'. In such a manner, the evacuated panels 4 and 4' have a tubular arrangement and fit with the tubular form of the interspace. Optionally, the opposed edges 5 and 5', respectively, may be mutually sealed by any known means, for instance by hot sealing.

The two so rolled panels 4 and 4' become reciprocally inserted and are preferably disposed in interspace 3 in such a way that the edges 5 of panel 4 are staggered with respect to edges 5' of panel 4' and are preferably arranged in a position diametrically opposed with respect to the edges 5', as shown in FIG. 1. Similarly, also the end edges 6 of rolled panel 4 are staggered with respect to end edges 6' of rolled panel 4', as appears from FIG. 2.

This construction, in which the edges of the panels are both diametrically and longitudinally staggered, is preferred because it allows a substantially even thermal insulation to be obtained by almost completely eliminating the heat passage that could occur through the poorly insulating zone at the edges of a panel. In particular, this construction practically eliminates the heat conduction between tubes 1 and 2 due to the radiation contribution, and also minimizes the contribution to heat loss due to convection of gases present in interspace 3.

The insulating system according to the present invention comprises at least two evacuated panels, with at least one of the evacuated panels of the insulating system comprising as a filling material a polymeric material, whereas at least another panel uses an inorganic filling material, which may be in the form of powders, fibers or mixtures thereof.

The evacuated panel with polymeric filling material may contain the material either in the form of powders or in the form of a porous one-piece board. Preferred polymeric materials are polystyrene and, particularly, polyurethane. Particularly preferred are panels containing a board of open-celled polyurethane. In these panels the thermal conductivity rises rather quickly with pressure, from about 10 mW/m·K when the internal pressure is about 1 mbar, up to about 35 mW/m·K at atmospheric pressure. For this reason, the envelope of the polymer-filled panel of the system of the invention is preferably made of a barrier sheet, generally of the multilayer type. Preferred multilayer sheets are those comprising a metal foil (preferably aluminum) surrounded by plastic layers for mechanical support, as widely known in the field. The polymer-filled panel may also contain a getter material or device, to get rid of the traces of gases that may penetrate into the panel over its working life. Panels of this kind are described for instance in U.S. Pat. No. 5,843,353.

The evacuated panel with inorganic filling material may contain powders, fibers or mixtures thereof.

In the case of fiber-filled panels, the fibers may be mineral or glass fibers, e.g. rock-wool and preferably glass-wool. Glass fibers suitable for use in the present invention are commercially available, and are sold for instance from the U.S. company Isorca Inc., of Granville, Ohio, under the trademark ISOMAT.

A preferred form of inorganic filling materials are powders of an inert material having preferably a mean particle size of less than 100 nanometers (nm) and preferably between about 2 and 20 nm. Particularly preferred is the use of silica. Silica having the desired dimensional characteristics can be obtained by precipitation from alkali solutions of silicates. This kind of silica is produced and sold for instance by the U.K. company Microtherm International Ltd., under the trademarks MICROTHERM G, MICROTHERM Super G or Waterproof MICROTHERM Super G. Alternatively, it is possible to use pyrogenic silica, a form of silica obtained by burning $SiCl_4$ in a special chamber with oxygen, according to the reaction:

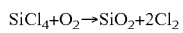

$$SiCl_4 + O_2 \rightarrow SiO_2 + 2Cl_2$$

The silica produced in this reaction is in the form of particles having dimensions between a few nanometers and some tens of nanometers, which can possibly be bound to form particles having larger dimensions. Pyrogenic silica is produced and sold for example by the U.S. company Cabot Corp. under the trademark NANOGEL® or by the German company Wacker GmbH.

Compared with polymer-filled panels, those based on inorganic powders undergo fewer changes in thermal insulating characteristics in case of cracks. As a matter of fact, the thermal conductivity of these panels changes only slightly upon entrance of air, thus remaining below about 8 mW/m·K for internal pressures up to some tens of mbars, and reaching a maximum value of about 20 mW/m·K at atmospheric pressure. As a consequence, the production of these panels has less stringent requirements as to the material used for the envelope, which in this case may be a simple plastic sheet.

It is also possible to use mixed kinds of inorganic fillers. For instance, it is possible to have a panel mainly containing powders, to which mineral fibers (e.g., glass fibers) are added, so as to obtain a mixed body that can be easily consolidated and produced in the form of blocks with a thickness of even a few millimeters. These blocks can be enveloped, evacuated and subsequently rolled with relative ease. Other inorganic additives may be added, such as opacifiers to reduce the radiant heat transport in the panel, as described in U.S. Pat. No. 6,110,310.

Panels with inorganic filling withstand high temperatures better than the ones comprising polymeric filling materials and can thus be used as a protection of the latter, by placing them in interspace 3 in contact with the hotter of tubes 1 and 2. Therefore, in the case of ducts for piping oil, these panels are favorably arranged directly in contact with the inner tube 1, so as to protect the panel comprising the polymeric filling material from possible damages due to a protracted exposure to the high temperatures of crude oil flowing in inner tube 1. In the case of FIG. 1, panel 4 comprises preferably an inorganic filling material, while panel 4' is based on a polymeric filling material.

Of course, the insulating system of the invention may comprise more than two panels, for instance three or four, compatible with cost, weight and overall thickness constraints imposed by the application.

Even though the present invention relates to the insulation of a conduit for piping oil, the insulating system according to the present invention can be used to insulate any other body having a tubular shape, for example a boiler or a pipe for transporting a cryogenic fluid, such as liquid nitrogen or oxygen.

The system of the invention has the advantage that it obtains very good thermal insulation properties, but with an overall lower weight and lower costs compared with systems using only panels containing microporous inorganic materials.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A heat insulating system for tubular bodies, comprising at least two superimposed evacuated panels, each panel being internally evacuated and being formed essentially by an envelope containing inside thereof a discontinuous or porous filling material, each panel being rolled up around a rolling axis and having two opposed edges parallel to the rolling axis which are set side by side and having two other edges perpendicular to the rolling axis which form end edges of the rolled evacuated panel, wherein at least one of the evacuated panels contains a filling material consisting essentially of polymeric material and at least another evacuated panel contains a filling material consisting essentially of inorganic material.

2. The heat insulating system according to claim 1, wherein the polymeric filling material comprises open-celled polyurethane.

3. The heat insulating system according to claim 1, wherein the inorganic filling material is selected from the group consisting of powders, fibers and mixtures thereof.

4. The heat insulating system according to claim 3, wherein the fibers comprise glass fibers.

5. The heat insulating system according to claim 3, wherein the powders comprise powders of an inert material having mean particle dimensions of less than 100 nanometers.

6. The heat insulating system according to claim 5, wherein the powders have mean particle dimensions between about 2 and 20 nanometers.

7. The heat insulating system according to claim 5, wherein the inert material comprises silica.

8. The heat insulating system according to claim 7, wherein the silica comprises pyrogenic silica.

9. The heat insulating system according to claim 1, wherein the envelope of at least one of the panels comprises barrier sheets.

10. The heat insulating system according to claim 9, wherein the barrier sheets are multilayer sheets.

11. The heat insulating system according to claim 10, wherein the multilayer sheets comprise at least one metal foil between two plastic layers.

12. The heat insulating system according to claim 10, wherein the multilayer sheets comprise at least one metallized plastic layer.

13. The heat insulating system according to claim 1, wherein the rolled evacuated panels are arranged with the edges of one of the evacuated panels diametrically and longitudinally staggered with respect to the edges of another evacuated panel.

14. The heat insulating system according to claim 1, wherein the at least one evacuated panel containing polymeric material further contains a getter material.

15. The heat insulating system according to claim 1, wherein the at least two superimposed evacuated panels are disposed in an interspace between two tubes.

16. The heat insulating system according to claim 15, wherein the at least another evacuated panel containing inorganic material is arranged in contact with a hotter of the two tubes.

17. A heat insulating system for tubular bodies, comprising at least two superimposed evacuated panels, each panel being internally evacuated and being formed essentially by an envelope containing inside thereof a discontinuous or porous filling material, each panel being rolled up around a rolling axis and having two opposed edges parallel to the rolling axis which are set side by side and having two other edges perpendicular to the rolling axis which form end edges of the rolled evacuated panel, wherein at least one of the evacuated panels comprises a porous polymeric filling material and at least another evacuated panel comprises an inorganic filling material.

18. The heat insulating system according to claim 17, wherein the porous polymeric filling material comprises open-celled polyurethane.

19. The heat insulating system according to clam 17, wherein the porous polymeric filling material has a form of a porous one-piece board.

* * * * *